May 17, 1966  H. L. RATLIFF, JR  3,251,284
CAMERA FOR MAKING WIDE-ANGLE STEREOSCOPIC PICTURES
Original Filed Nov. 15, 1962  8 Sheets-Sheet 1

INVENTOR.
BY Harvey L. Ratliff Jr.

May 17, 1966   H. L. RATLIFF, JR   3,251,284
CAMERA FOR MAKING WIDE-ANGLE STEREOSCOPIC PICTURES
Original Filed Nov. 15, 1962   8 Sheets-Sheet 2

INVENTOR.
BY Harvey L. Ratliff Jr.

May 17, 1966  H. L. RATLIFF, JR  3,251,284
CAMERA FOR MAKING WIDE-ANGLE STEREOSCOPIC PICTURES
Original Filed Nov. 15, 1962  8 Sheets-Sheet 3

INVENTOR.

BY *Harvey L. Ratliff jr.*

May 17, 1966  H. L. RATLIFF, JR  3,251,284
CAMERA FOR MAKING WIDE-ANGLE STEREOSCOPIC PICTURES
Original Filed Nov. 15, 1962  8 Sheets-Sheet 4

INVENTOR.
BY *Harvey L. Ratliff Jr.*

FIG. 18

May 17, 1966  H. L. RATLIFF, JR  3,251,284
CAMERA FOR MAKING WIDE-ANGLE STEREOSCOPIC PICTURES
Original Filed Nov. 15, 1962  8 Sheets-Sheet 6

INVENTOR.
BY *Harvey L. Ratliff Jr.*

INVENTOR.
BY Harvey L. Ratliff Jr.

United States Patent Office 3,251,284
Patented May 17, 1966

3,251,284
CAMERA FOR MAKING WIDE-ANGLE
STEREOSCOPIC PICTURES
Harvey L. Ratliff, Jr., Lubbock, Tex., assignor to
Jetru Inc., Amarillo, Tex.
Original application Nov. 15, 1962, Ser. No. 237,795.
Divided and this application Feb. 1, 1965, Ser. No. 429,317
5 Claims. (Cl. 95—18)

This application is a divisional application of my copending prior application Serial No. 237,795 filed Nov. 15, 1962, now abandoned.

A brief summary of the invention is as follows:

A description of the preferred process—

Step 1.—The recording on film of the wide-angle and stereoscopic background scenery.

Step 2.—The recording on film of the various stereoscopic subject matter and other views which may or may not require wide-angle recording to be added to the scene.

Step 3.—The integrating of the various parts of the scene into one very wide-angled stereoscopic scene.

Step 4.—The reproduction of the product resulting from Step 3 in a form ready for viewing.

Step 5.—The constructing and reproducing of a viewing device for allowing the consumer to see the very wide-angle and stereoscopic scene created.

A description of the shortened process—

Step 1.—The recording on film a wide-angle and stereoscopic picture with the aid of a specially made wide-angle and stereoscopic camera.

Step 2.—The preparing of this picture and/or reproduction thereof to be placed in a specially made wide-angle viewer.

Step 3.—The constructing and reproducing of a viewing device for allowing the consumer to see the very wide-angle and stereoscopic scene photographed.

Figure 1:
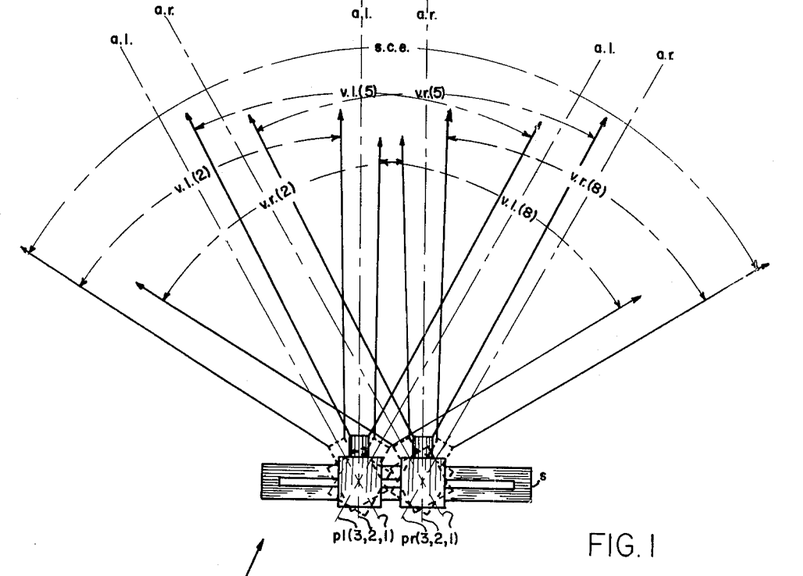
FIGS. 1 and 2 are a top view and a side view of the same apparatus used as the first and third method of accomplishing Step 1 of the preferred process.
Figure 2:
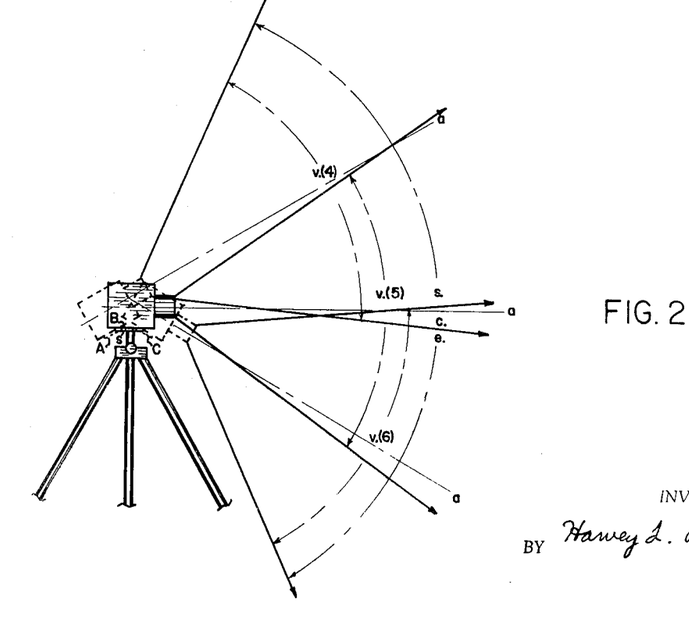

There are three methods of performing Step 1 of the preferred process. The first one is illustrated by FIGS. 1 and 2. The supporting platform (shown as $s$ in FIGS. 1 and 2) may be placed in the horizontal position substantially parallel to the scene to be photographed ($s.c.e.$). With ($s$) at this position as shown in FIG. 1, which is position (B) of FIG. 2, the axis of the left-eye-view camera ($a.l.$) and the axis of the right-eye-view camera ($a.r.$) may be horizontal and making any desirable angle with the long edges of ($s$), in a plane parallel to ($s$). FIG. 1 shows that in position $v.l.(2)$, ($a.l.$) makes an angle of approximately 120° with ($s$). Also, in position $v.r.(2)$, ($a.r.$) makes the same angle with ($s$). As further shown by FIG. 1, in positions $v.l.(5)$ and $v.r.(5)$, ($a.l.$) and ($a.r.$) make angles of approximately 90° with ($s$); and in positions $v.l.(8)$ and $v.r.(8)$, ($a.l.$) and ($a.r$) make angles of approximately 60° with ($s$). So then it may be seen that in the performance of Step 1, when ($s$) is in position (B) each camera takes 3 pictures: $v.l.(2)$, $v.l.(5)$, $v.l.(8)$, $v.r.(2)$, $v.r.(5)$ and $v.r.(8)$, as shown in FIG. 1. Similarly, when ($s$) is in position (A), which is approximately 30° above the horizontal as shown in FIG. 2, each camera takes 3 pictures: $v.l.(1)$, $v.l.(4)$, $v.l.(7)$, $v.r.(1)$, $v.r.(4)$, and $v.r.(7)$ (not shown in FIG. 1 or FIG. 2). Also, when ($s$) is in position (C), which is approximately 30° below the horizontal as shown in FIG. 2, each camera takes 3 pictures: $v.l.(3)$, $v.l.(6)$, $v.l.(9)$, $v.r.(3)$, $v.r.(6)$ and $v.r.(9)$. Therefore, it may be seen that when this method of performing Step 1 of the preferred process is used, there will be 18 separate conventional pictures to be used for creating the background for the final wide-angle stereoscopic picture to be viewed.

It is now pointed out that the arbitrarily picked angles of 30°, 60°, 90° and 120° were picked for the sake of explanation only and applicant does not wish to imply that this invention is limited to these.

Figure 3:
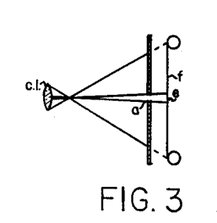
FIGS. 3-5 illustrate various concepts involved in the second method of accomplishing Step 1 of the preferred process.
Figure 4:
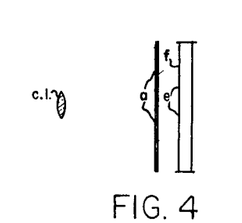
Figure 5:
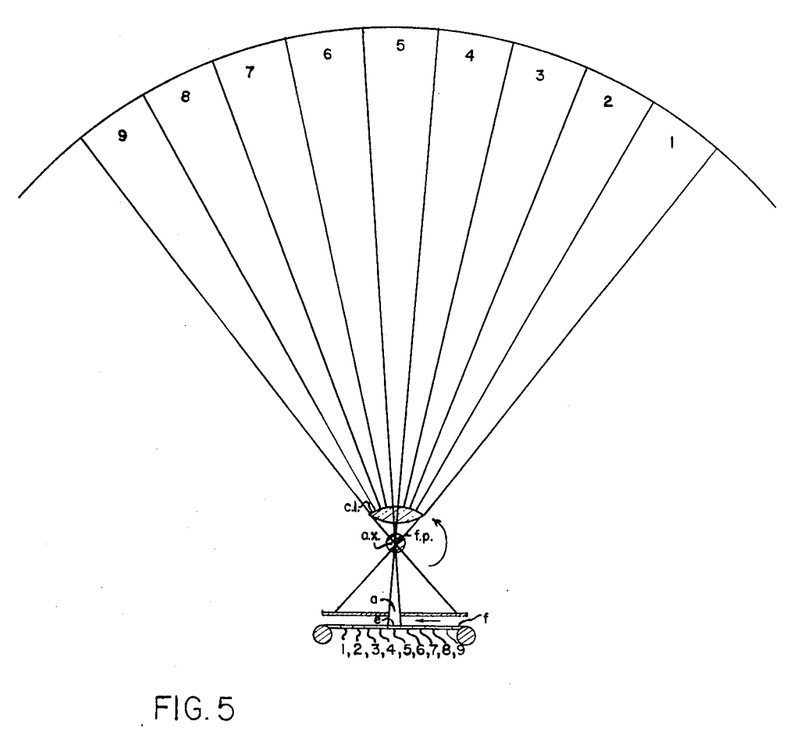
Figure 6:
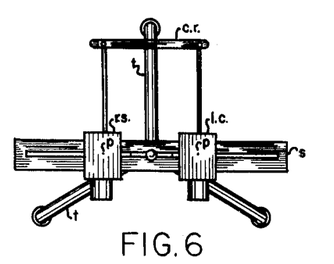
FIGS. 6-11 illustrate various apparatus required to accomplish the second method of accomplishing Step 1 of the preferred process.

The second method of performing Step 1 of the preferred process is illustrated by FIGS. 3–11 inclusive. The first part of the basic principle of this method is that of limiting by aperture ($a$), (FIGS. 3, 4, and 5), the amount of light reaching film ($f$), (FIGS. 3, 4, and 5), to the area of a very thin vertical strip of light ($e$) (FIGS. 3, 4, and 5). Lens ($c.l.$) is a wide-angle lens with an angle of view greater than 80° or 90°, with its widest angle of view vertical (not horizontal as in the conventional case).

The second part of the basic principle of this method is that of rotating a camera containing film ($f$), aperture ($a$), and wide-angle lens ($c.l.$) of FIGS. 3, 4, and 5 about the focal point ($f.p.$) of lens ($c.l.$) of FIG. 5 while allowing the film to be exposed by light passing through a conventional shutter mechanism (not shown) and aperture $a$ of FIG. 5.

The third part of the basic principle of this method is that of linearly moving film ($f$) of FIG. 5 a linear distance which is angularly equivalent and opposite in direction to the angular magnitude the camera is rotated about ($f.p.$) of FIG. 5. In other words, if the camera is rotated about ($f.p.$) of FIG. 5, 1° in the direction of the angular arrow shown, the film ($f$) of FIG. 5 will be moved linearly a distance equivalent to 1° about ($f.p.$) of FIG. 5 in the direction of the linear arrow.

It is here pointed out that applicant wishes ultimately to find the best way of accomplishing the basic principle set forth hereinabove and does not wish to be limited to the specific structure described in the following phrases.

It may be seen that in FIG. 5 the camera is now in position 5. It may now be seen that when the camera was in position 1, area 1 of film ($f$) was exposed; when the camera was in position 2, area 2 of ($f$) was exposed; when the camera was in position 3, area 3 of ($f$) was exposed, etc. At the present time area 5 of ($f$) is exposed, and when the camera is rotated about ($f.p.$) to position 6, area 6 of ($f$) will be exposed; when the camera is rotated about ($f.p.$) to position 7, area 7 of ($f$) will be exposed, etc.

Figures 7, 8, 11:
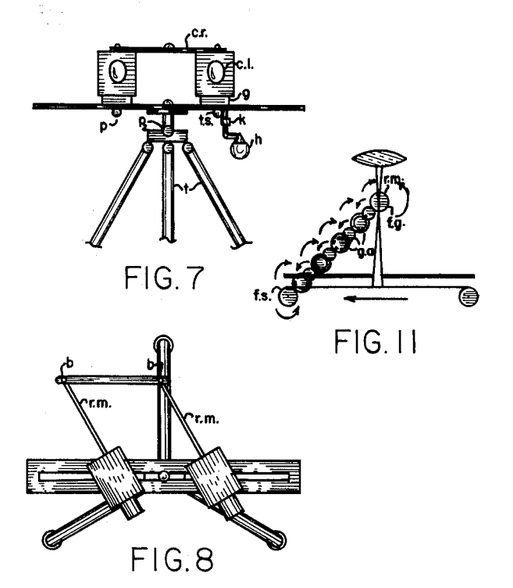
Figure 9:
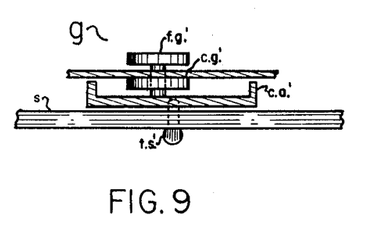
Figure 10:
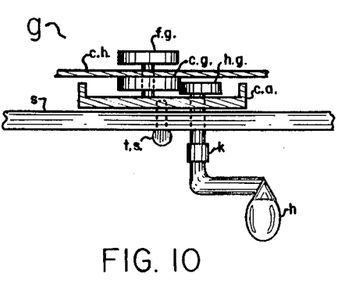
Figure 12:
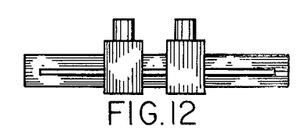
FIGS. 12-17 illustrate various apparatus and concepts used to accomplish Step 2 of the preferred process.
Figure 13:
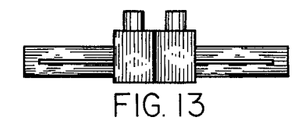
Figure 14:
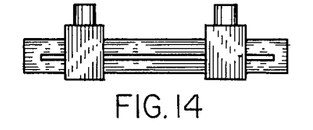
Figure 15:
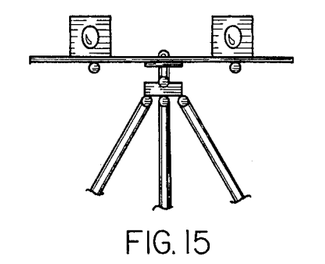

One structural mechanism for accomplishing the second method of the first step is shown by FIGS. 6-11 inclusive. It consists of a right-hand camera ($r.s.$) and a left-hand camera ($l.c.$), both of FIG. 6. Of course, ($r.s.$) takes pictures to be viewed with the right eye, and ($l.c.$) takes pictures to be viewed with the left eye. The cameras are connected by connecting rod ($c.r.$) shown in FIG. 6; and bearings ($b$) and rigid members ($r.m.$), both shown in FIG. 8, so that any angular movement made by one camera must be made by the other. The cameras rotate about their own respective pivot points (p) shown in FIGS. 6 and 7. The cameras are attached to support (s) shown in FIG. 6 by thumb screws (t.s.) shown in FIG. 7. In FIG. 7 (c.l.) is a wide-angle lens, with its wide angle vertical. Between the thumb screws (t.s.) and camera (l.c.) there is a gearing mechanism (g) of FIG. 7 (shown more clearly in FIG. 10). The chassis (c.a.) of (g) is secured to support (s) so that it may not rotate about support (s). The gear (f.g.) which rotates the film (f) of FIGS. 5 and 11 is secured to chassis (c.a.) so that it does not rotate about (c.a.) or (s). The gear (c.g.) is secured to camera hull (c.h.) so that it does not rotate with respect to the camera, and so that when it is rotated with respect to (s) and (c.a.), the camera must rotate with respect to (s) and (c.a.). Therefore, it may be seen that when the camera is rotated with respect to (s) and (c.a.), (f.g.) rotates with respect to the camera. It may then be seen that (f.g.)—through a gearing arrangement (g.a.) of FIG. 11—may rotate film spool (f.s.) of FIG. 11 at a speed necessary to accomplish the third part of the basic principle described earlier. Now it may be seen that (h.g.) may be rotated by a motor means or by a crank (h) of FIG. 10. FIG. 10 also shows a coupling means (k) used to facilitate the placing of the cameras on support (s) since the crank (h) may be disconnected. Now it may also be seen that when (l.c.) is rotated, (r.s.) is automatically rotated through (r.m.), (b) and (c.r.). In both cameras (r.m.) is a ratchet mechanism to insure that the film is moved in only one direction. It then becomes obvious that (f.g.') would act the same with respect to (c.a'.) and (c.h'.) in (r.s.) of FIG. 9 as the corresponding parts in (l.c.) of FIG. 10.

The third method of performing Step 1 of the preferred process is to use two wide-angle cameras with angles of view from 100° to 180° in positions v.l.(5) and v.r.(5) as shown in FIG. 1.

Figure 16:
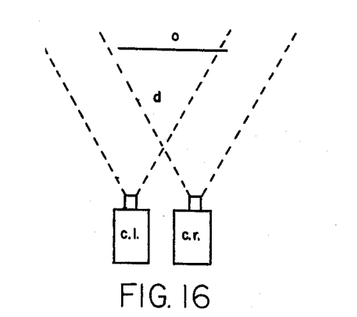
Figure 17:
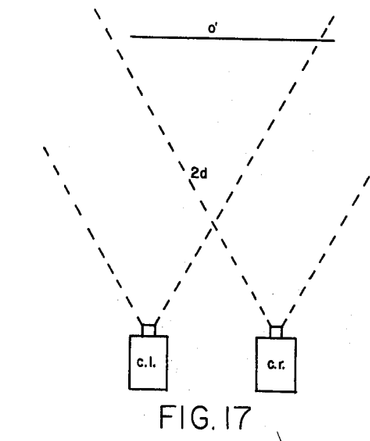

Step 2 of the preferred process is that of recording on film in stereoscopic form various subject matter for the finished wide-angle view. It is obvious that Step 1 is not as adaptable to action scenes as the use of a conventional small-angle stereoscopic camera which may be used to accomplish Step 2. Also, by varying the distance between the cameras of FIGS. 12–15 from the interpupillary distance (2.56 inches) the subjects may be made to appear thicker than they really are or thinner; farther away or closer; larger or smaller. Thus a small house cat could be made to appear as a tiger a few feet away. This becomes more obvious when FIGS. 16 and 17 are observed. It may be seen that o', which is twice the size of o and twice the distance (2d) that o is from cameras (c.l.) and (c.r.), may be made to appear the size of o and a distance (d) from the observer by placing the cameras (c.l.) and (c.r.) twice the interpupillary distance (2.56 inches) apart. The general principle which FIGS. 16 and 17 are desired to demonstrate is that o' and o would appear as objects of the same size and the same distance from the observer when viewed in a stereoscopic viewer. It is also here pointed out that placing the cameras wider apart than the interpupillary distance is also a means for making an object appear closer than it was to the camera when the picture was taken. This is especially true when the thickness of the object is unimportant, because then the object could be enlarged so as to appear to be its real size, but closer to the viewer than it was in reality.

A few ways of recording desired subject matter on film have been pointed out, but Step 2 is intended to encompass all known ways of recording desired subject matter on film in stereoscopic form.

Figure 18:
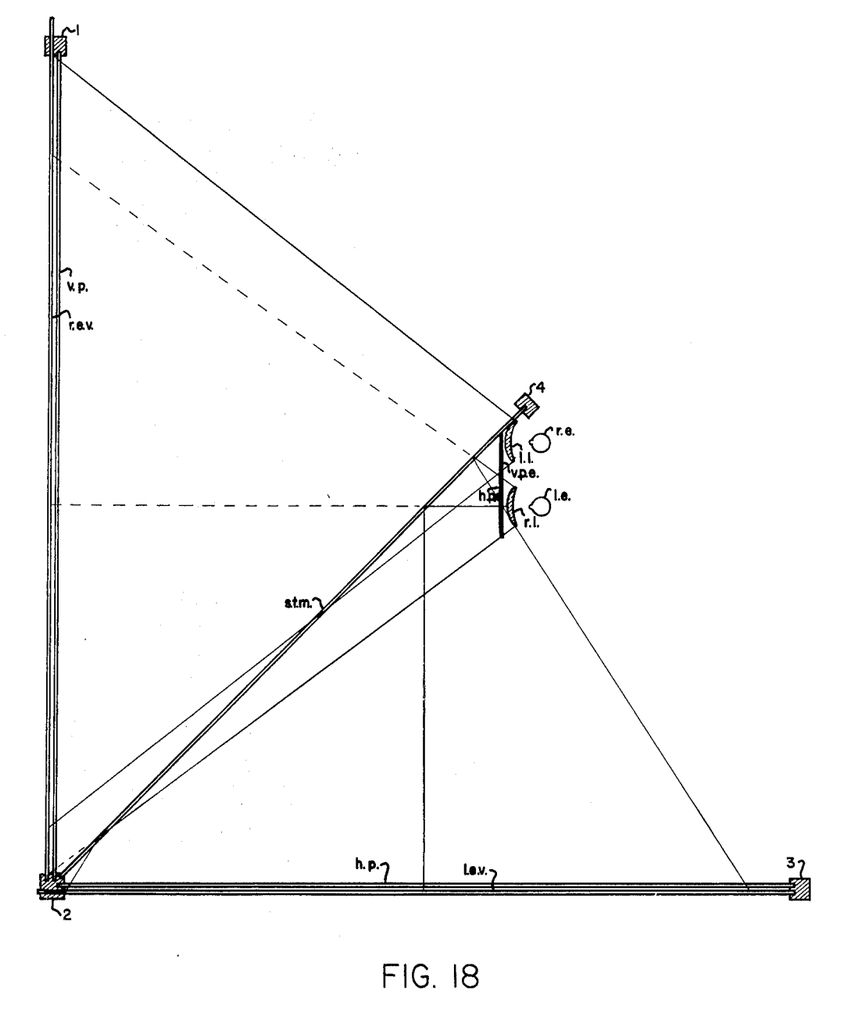
FIG. 18 illustrates an apparatus and concepts used to accomplish Step 3 of the preferred process.

Step 3 of the preferred process is that of integrating the various parts of the scene into one wide-angle, stereoscopic scene. The background views (for the right and left eyes) are enlarged so that at approximately 24″ from eyes (r.e.) and (l.e.) of FIG. 18, all objects will appear to be their natural size. For the sake of description we will say that (v.p.) and (v.p.e.) are light-polarizing means with their plane of polarization vertical, and (h.p.) and (h.p.e.) are light-polarizing means with their plane of polarization horizontal. However, the only requirement, of course, is that the plane of polarization of (h.p.) and (h.p.e.) be rotated 90° from the plane of polarization of (v.p.) and (v.p.e.), respectively. In order to allow work to be done on the right-eye view (r.e.v.) of FIG. 18 (v.p.) may be slid upward in supporting means 1 and 2. Similarly (h.p.) may be slid upward in supporting means 2 and 3 in order to allow work to be done on the left-eye view (l.e.v.). It may be seen that (s.t.m.) is a semi-transparent mirror supported by supporting means 2 and 4, and (r.l.) and (l.l.) are right eye and left eye lenses respectively. It may be seen that when (v.p.) is slid up so that it is no longer in front of (r.e.v.) the right eye (r.e.) can see (r.e.v.) but not (l.e.v.); however, the left eye (l.e.) can see both (l.e.v.) and (r.e.v.). With this description of the easel illustrated in FIG. 18, it may be more clearly explained how Step 3 is performed. First, the background scenery photographs are supported by (l.e.v.) and (r.e.v.) of FIG. 18. These photos may be pieced together while alternately pulling up (v.p.) or (h.p.) Of course, the use of wide-angle cameras, to perform Step 1, greatly simplifies the performance of Step 3. If the angle of view of the picture recorded by a wide-angle camera is greater than the angle of view allowed by the easel the right-eyed picture may be extended through supporting means 1, and the left-eyed picture may be extended through supporting means 2 as shown by FIG. 18. After the background scenery photographs are placed in a naturally appearing relationship in the easel illustrated in FIG. 18, the subject matter photographs may be placed in a natural appearing relationship. Of course, this may be done with the aid of conventional photographic development equipment, enlargers, etc. As mentioned earlier, a house cat may be made to appear to be a tiger three feet away, with a background view of a jungle, open plains, or anything desired.

Step 4 of the preferred process is that of reproducing the product resulting from Steps 1–3. This step is illustrated by FIGS. 19, 20, 25, 27 and 28.

Figure 24:
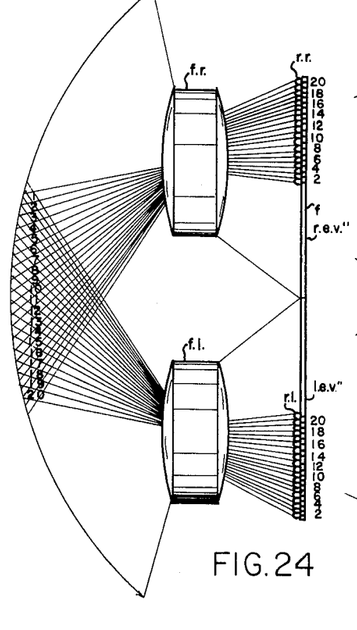
FIGS. 24-27 illustrate apparatus and concepts necessary for accomplishing Step 4 of the preferred process and Steps 1 and 2 of the shortened process.
Figure 25:
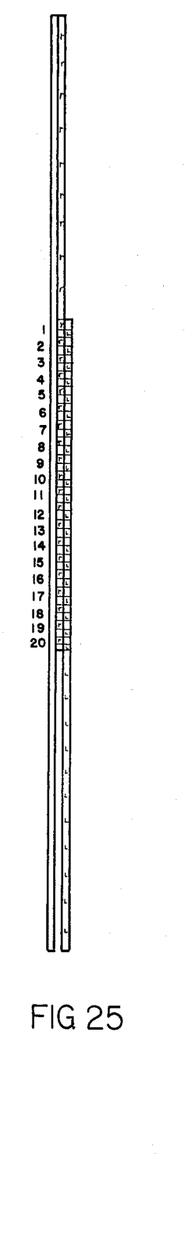

In order to describe completely Step 4 of the preferred process, it is necessary to describe the first two steps of the shortened process in detail. The first step of the shortened process is illustrated by FIGS. 24–27. In this process two wide-angle lenses between 90° and 180° are used in a camera. In one form of the first two steps of this process the area of the film (f) which records the part of the view (1–20 of FIG. 24) which will be scanned by by both eyes—when viewed in a viewer later—is placed behind a series of thin, vertical, tubular plano-convex lenses which focus on a line rather than a point. These lenses would cause the film (f) to be exposed in thin, vertical strips in conjugate relationship with thin, vertical unexposed strips of about equal width. Step 2 of this form of the process is illustrated by FIG. 25. FIG. 25 illustrates a contact print of the two pictures turned right side up and stuck together with the strips exposed by (f.r.) and (r.r.) placed so as to print in conjugate relationship with the strips exposed by (f.l.) and (r.l.).

Figure 26:
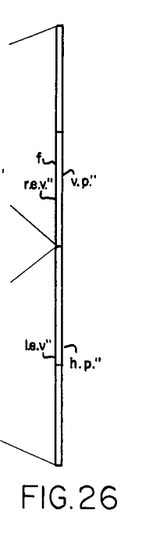

In another form of the first two steps of the shortened process the film for (r.e.v".) of FIG. 26 is polarizing in one plane and the film for (l.e.v".) is polarizing in a plane which is rotated 90° from that for (r.e.v".). Then (r.e.v".) and (l.e.v".) are developed on film polarized as described which we will call (v.p".) and (h.p".) respectively (see FIG. 27), and backed by a reflecting surface—(r.s.) of FIG. 27—to be placed in a viewer later.

Figure 19:
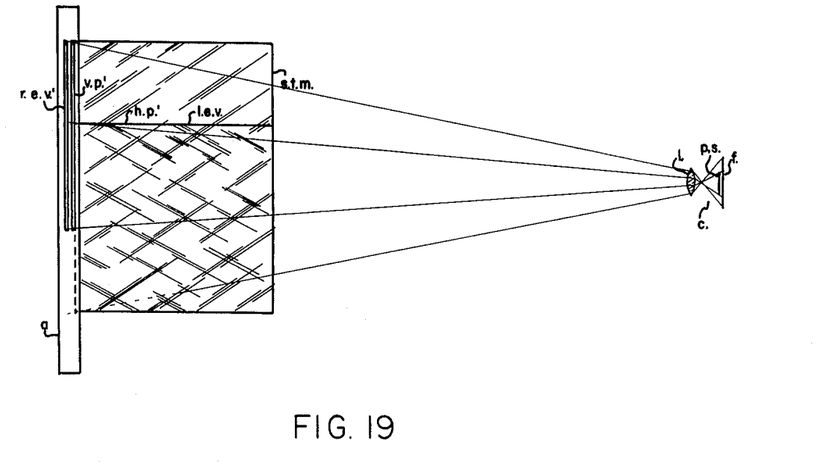
FIGS. 19, 20 and 28 illustrate apparatus and concepts used to accomplish Step 4 of the prefererd process.
Figure 20:
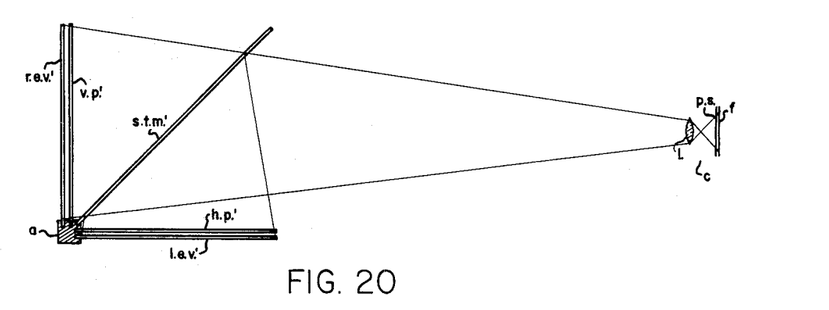
Figure 28:
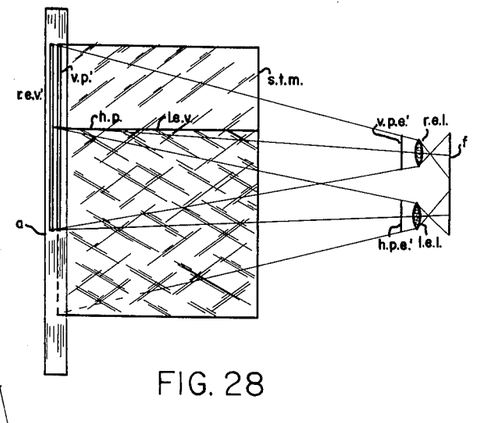

At this stage it is possible to describe Step 4 of the preferred process. First, the easel used in performing Step 4 will be described. It is illustrated in FIGS. 19, 20 and 28. FIGS. 19 and 28 show it from a top view, and FIG. 20 shows it from a side view in order to clarify the position of its structural elements. The position of (s.t.m'.) may be clearly seen in FIG. 20. It may be seen from FIG. 20 that (v.p'.) and (h.p'.) are in planes which would intersect on a line which would be about horizontal, and that (r.e.v'.) is in a plane parallel to and immediately behind (v.p'.). Similarly, (l.e.v'.) is in a plane parallel to and immediately behind (h.p'.). It is necessary for (v.p'.) and (h.p'.) to be large enough in area to completely cover the widest angle (r.e.v'.) and (l.e.v'.) respectively. By looking at FIGS. 19 and 28 it may be seen that (r.e.v'.) and (v.p'.) are adjusted in adjusting means (a) such that there is overlap between them and (l.e.v'.) and (h.p'.); however, they may be adjusted in adjusting means (a) such that there is no overlap. Of course, the semi-transparent mirror (s.t.m'.) must be wide enough to reflect or transmit from both pictures when there is no overlap.

Figure 21:
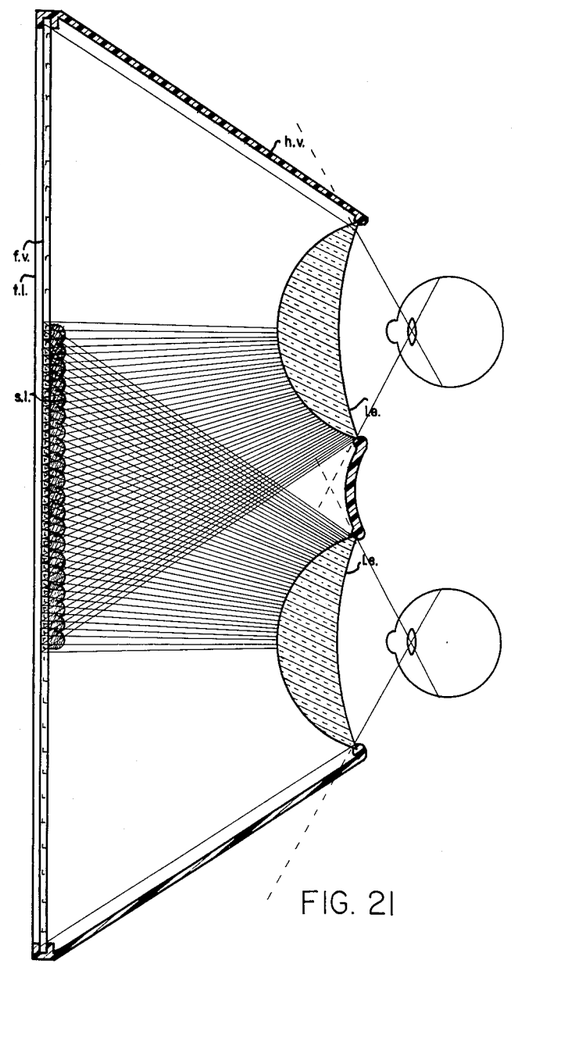
FIGS. 21, 22, 23, and 29 illustrate apparatus and concepts used to accomplish Step 5 of the preferred process and Step 3 of the shortened process.

One way of performing Step 4 of the preferred process is illustrated in FIGS. 19 and 20. After the overlap of (l.e.v'.) and (r.e.v'.) is adjusted so that the scene will appear properly when viewed in a viewer such as is illustrated in FIG. 21, for example; a camera such as (c) in FIGS. 19 and 20 may be used to record the scene on film. It may be seen that the camera (c) has a converging lens (l) and film (f). It is here pointed out that a sheet of polarizing paper (p.s.) which is transparent to polarized light is placed over the overlapped area which would otherwise be exposed to the image of both (r.e.v'.) and (l.e.v'.). Said paper (p.s.) consists of thin, vertical, tubular polarizing strips in conjugate relationship. One type of the polarizing strips has its polarizing axis identical to that of (v.p'.); the other type of polarizing strips has its polarizing axis identical to that of (h.p'.). It should be apparent then that the developed picture taken with camera (c) of FIG. 19 should be similar to that shown as (f.v.) of FIG. 21, having thin, vertical, tubular strips of portions of (r.e.v.) in conjugate relationship to thin, vertical, tubular strips of portions of (l.e.v.). When this picture is viewed through a proper reticle similar to that shown by (r.e.) of FIG. 23, the right eye can see only that portion of the picture it should, and the left eye can see only that portion of the picture it should.

Another way of performing Step 4 of the preferred process is illustrated in FIG. 28. Either one camera with two lenses or two separate cameras may be used. In either case a polarizing medium (v.p.e'.) must be placed over the lens which is to photograph (r.e.v'.), and a polarizing medium (h.p.e'.) must be placed over the lens which is to photograph (l.e.v'.). The axis of polarization of (v.p.e'.) and (h.p.e'.) must be identical to that of (v.p'.) and (h.p'.) respectively. The recording on film (f) of FIG. 28 may be done either by the same method as shown in FIG. 24 and described earlier in the description of the shortened process, or by the same method shown in FIG. 26 and described earlier in the description of the shortened process.

Step 5 is the constructing and reproducing of a proper viewing device for allowing the consumer to see the wide-angle stereoscopic scene. Step 5 is illustrated by FIGS. 21, 22, 23, and 29. FIG. 21 is intended to indicate a viewer for as wide-angle a stereoscopic picture (f.v.) as is possible with the picture (f.v.) remaining completely flat while being viewed. The hull (h.v.) may be either translucent, in which case (t.l.) could be reflective; or opaque, in which case (t.l.) would be translucent. The tubular, vertical, thin, plano-convex lenses (s.l.) of course focus in lines rather than points. These lenses (s.l.) are, of course, much smaller in every dimension except the vertical dimension than FIG. 21 indicates. They are only shown this large for the purpose of illustration. These lenses (s.l.) may be either part of the viewer itself or integral with the picture (f.v.). The picture (f.v.) may be either a transparency or an opaque picture. Of course, if the picture is opaque, the hull (h.v.) would be translucent. It may be noted by observing FIG. 21 that the portion of (f.v.) which is viewed by both the left and right eye is divided into thin, vertical, tubular strips in conjugate relationship, marked (l) and (r). The letter (l) is to indicate a strip of the picture (f.v.) which is to be viewed with the left eye, and the letter (r) is to indicate a strip of the picture (f.v.) which is to be viewed with the right eye. The lenses (s.l.) are placed in such a position (as shown by FIG. 21) that the left eye can see only strips (l) for the left eye, and the right eye can see only strips (r) for the right eye. This may possibly be seen more clearly by observing FIG. 23 where reticles (r.e.) are used rather than lenses (s.l.) as in FIG. 21. However, it is obvious that the lenses (s.l.) have an advantage over reticles (r.e.) in that they may magnify strips (r) and (l) such that the left eye sees one continuous picture and the right eye sees one continuous picture. Strips (r) and (l) and the lenses (s.l.) may be so thin that the distortion is not detectable with the normal eye. This is especially true when it is considered that the process illustrated by FIGS. 24 and 28, and described earlier in the description of the shortened process, would tend to distort the strips (r) and (l) in such a way as to compensate for the distortion (s.l.) would now give them. It would be preferable if the lenses (l.e.) would be concavo-convex to allow the viewer a wider angle view; however, applicant does not wish to be limited to concavo-convex lenses. The lenses may be plano-convex, convex, or concave, etc. The lenses may be of plastic, glass or other known and advantageous material.

Figure 22:
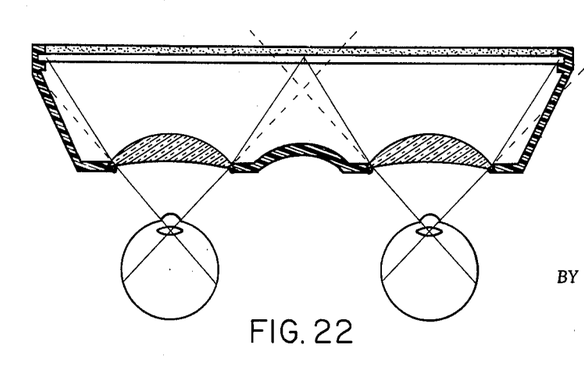
Figure 23:
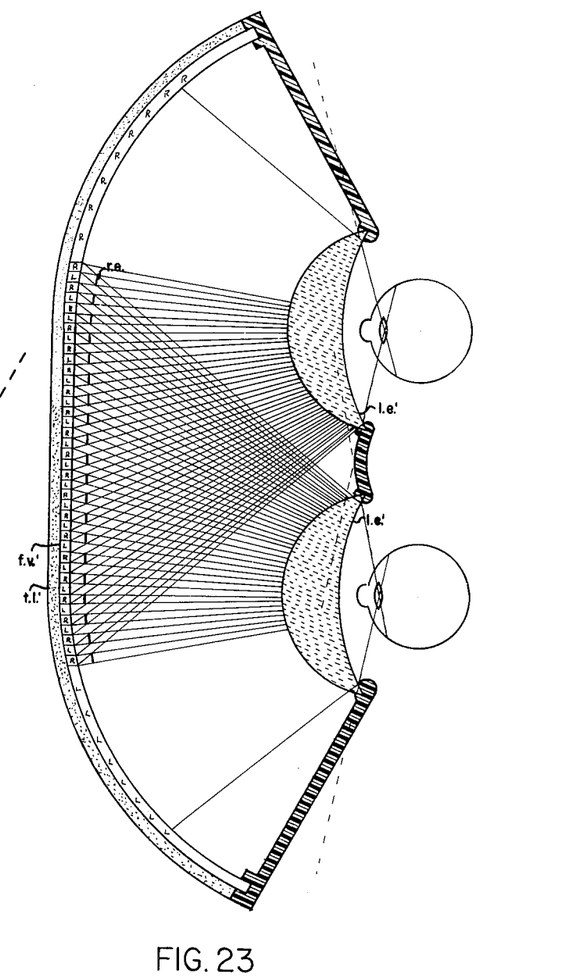

FIG. 23 is a viewer designed to give the viewing observer as wide angle a view as is possible. The angle of view is indicated by the broken lines in FIGS. 21, 22 and 23. The reticle (r.e.) of FIG. 23 was primarily shown for the purpose of illustration, and will probably prove to be less desirable than the lenses (s.l.) of FIG. 21.

Figure 27:
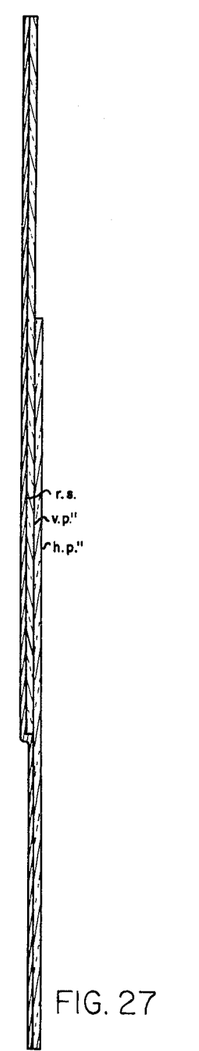

FIG. 22, on the other hand, is a viewer designed to give the viewing observer an angle of view as wide as is possible without using lenses (s.l.) shown in FIG. 21, a reticle (r.e.) shown in FIG. 23, or two polarized pictures (v.p''.) and (h.p''.) as shown in FIG. 27. In other words, it gives an angle of view as wide as possible without any overlap.

Figure 29:
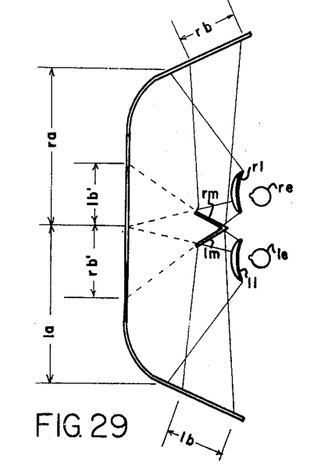

FIG. 29 illustrates a viewer that may prove practical. It uses mirrors (r.m.) and (l.m.) to provide the eyes (r.e.) and (l.e.) respectively with a view of pictures (r.b.) and (l.b.) which would normally have to be placed in the areas (r.b'.) and (l.b'.). So the right eye (r.e.) would see (r.a.) and apparently (r.b'.), but actually (r.a.) and an image of (r.b.). The left eye (l.e.) would see (l.a.) and apparently (l.b'.), but actually (l.a.) and an image of (l.b.).

The viewers of FIGS. 21, 22, 23, and 29 would, of course, be mass produced as cheaply as is possible. It is intended to be in the scope of this invention that the lenses of the viewers illustrated in FIGS. 21, 22, 23 and 29 may be made adjustable in the conventional manners.

The description of the shortened process mentioned above in the description of Step 4 of the preferred process may be continued here. Actually, Step 3 of the shortened process is the same as 5 of the preferred process.

It is here pointed out that (f.r.) and (f.l.) of the camera of FIG. 24 illustrating part of the shortened process could be arranged such that the image from (f.r.) would fall directly behind (f.l.) and the image from (f.l.) would fall directly behind (f.r.).

The picture illustrated by FIG. 27 may be viewed in a viewer similar to that illustrated by FIG. 21, by the addition of obvious polarizing filter means between each lens and said picture.

At this point the wide-angle and stereoscopic camera of FIG. 24 will be described in greater detail. The camera of FIG. 24 has two wide-angle lens arrangements (f.l.) and (f.r.) which are separated by the interpupillary distance of 2.56 inches. The right wide-angle lens arrangement (f.r.) is used to expose right-eye-view picture (r.e.v".). The left-wide-angle lens arrangement (f.l.) is used to expose left-eye-view picture (l.e.v".). The camera of FIG. 24 has a conventional arrangement of shutter and aperture. The film (f) of FIG. 24 is supported in such a position that a complete image of the wide-angle right-eye view may be formed upon (f) at (r.e.v".) and a complete image of the wide-angle left-eye view may be formed upon (f) at (l.e.v".). A rectangular optical means (r.r.), which is as long as (f) is wide and as wide as the area of overlapped view, and is located in the extreme right portion of (r.e.v".). The area of overlapped view is the area which both the right eye and the left eye of a viewing observer will see after (f) is processed and placed in a viewer later. An optical means (r.l.) occupies an area of the same configuration as (r.r.) in the extreme left portion of (l.e.v".). Each optical means (r.r.) and (r.l.) is such that after film (f) is processed and placed in a viewer, the viewing observer will see only the right-eye view in said overlapped area with his right eye, and only the left-eye view in said overlapped area with his left eye. As stated hereinabove, the angle of view of (f.r.) and/or (f.l.) is between 100° and 180°. The optical means (r.r.) and (r.l.) may be a series of thin, tubular, long plano-convex lenses which focus at lines rather than points; a series of thin, long, reticles which are in conjugate relationship with a series of thin, long transparent areas, which are, for practical purposes, of the same dimensions as said reticles; or the optical means may be the film itself, (r.e.v".) having a first axis of polarization (v.p".) and (l.e.v".) having a second axis of polarization (h.p".) which is rotated 90° from that of (v.p".), see FIG. 26.

What is claimed is:

1. In a wide-angle and stereoscopic camera, apparatus comprising: means for supporting right and left extremely wide-angle taking lenses with their optical axes spaced approximately the interpupillary distance apart, the angle of view of each of said lenses being in axcess of 120° in a horizontal plane and in excess of 100° in a vertical plane, said lenses focusing respective right and left extremely wide-angle images upon a common focal plane and having partially overlapping fields of view imaged at the extreme ends of each of said respective images.

an aperture means and a shutter mechanism located on each of said axes intermediate said lenses and said focal plane, first optical means adjacent said focal plane and intermediate said lenses and said focal plane and intercepting only an extreme end portion of one of said images which is representative of said overlapping field of view for one of said lenses, second optical means adjacent said focal plane and intermediate said lenses and said focal plane and intercepting only an extreme end portion of the other of said images which is representative of said overlapping field of view for the other of said lenses, said first and second optical means serving to optically modify the portions of said images which are incident thereon to thereby distinguish said portions as having originated only from said partially overlapping fields of view and also as right and left eye stereo views of said overlapping fields, whereby said images may be recorded as respective extremely wide-angle right and left eye fields of view, thus eliminating any visible demarcation between the adjacent edges of the right and left eye views.

2. The apparatus of claim 1 wherein said first and second optical means are lenticular screen means.

3. The apparatus of claim 1 wherein said first and second optical means are grating screen means.

4. The apparatus of claim 1 wherein said first and second optical means are polarizing differentiating means.

5. The apparatus of claim 1 wherein the angle of view of each of said lenses is 180°, in both the horizontal and vertical plane.

References Cited by the Examiner
UNITED STATES PATENTS

| | | | |
|---|---|---|---|
| 2,063,985 | 12/1936 | Coffey | 95—18 |
| 2,413,996 | 1/1947 | Ramsdell | 95—18 |
| 2,566,110 | 8/1951 | Backus | 95—18 |
| 2,568,327 | 9/1951 | Dudley | 95—18 |
| 2,794,380 | 6/1957 | Rehorn | 95—18 |
| 2,883,906 | 4/1959 | Rehorn | 352—61 X |
| 2,953,980 | 9/1960 | Montebello | 95—18 |

JOHN M. HORAN, *Primary Examiner.*